(12) United States Patent
Childress

(10) Patent No.: US 10,065,740 B2
(45) Date of Patent: Sep. 4, 2018

(54) SYSTEMS AND METHODS FOR CLEANING A LAVATORY FLOOR

(71) Applicant: THE BOEING COMPANY, Chicago, IL (US)

(72) Inventor: Jamie Childress, Mercer Island, WA (US)

(73) Assignee: The Boeing Company, Chicago, IL (US)

( * ) Notice: Subject to any disclaimer, the term of this patent is extended or adjusted under 35 U.S.C. 154(b) by 29 days.

(21) Appl. No.: 15/175,254

(22) Filed: Jun. 7, 2016

(65) Prior Publication Data
US 2017/0283062 A1   Oct. 5, 2017

Related U.S. Application Data

(60) Provisional application No. 62/315,999, filed on Mar. 31, 2016.

(51) Int. Cl.
*B64D 11/02* (2006.01)
*B08B 5/04* (2006.01)
*A47L 7/00* (2006.01)

(52) U.S. Cl.
CPC ............ *B64D 11/02* (2013.01); *A47L 7/0004* (2013.01); *B08B 5/04* (2013.01)

(58) Field of Classification Search
CPC .......... B64D 11/02; A47L 7/0004; B08B 5/04
See application file for complete search history.

(56) References Cited

U.S. PATENT DOCUMENTS

| | | | | |
|---|---|---|---|---|
| 3,995,328 A | | 12/1976 | Carolan | |
| 4,063,315 A | | 12/1977 | Carolan | |
| 4,533,352 A | * | 8/1985 | Van Beek | A61G 13/102 604/313 |
| 4,819,276 A | | 4/1989 | Stevens | |
| 5,020,638 A | * | 6/1991 | Smith | F16N 31/006 184/1.5 |
| 5,176,667 A | * | 1/1993 | DeBring | A61F 5/48 4/144.1 |
| 5,349,965 A | * | 9/1994 | McCarver | A61G 13/102 128/846 |
| 5,827,246 A | * | 10/1998 | Bowen | A61M 1/008 604/313 |
| 6,102,073 A | * | 8/2000 | Williams | A61M 1/008 137/312 |
| 6,290,685 B1 | * | 9/2001 | Insley | A61M 1/008 165/6 |

(Continued)

FOREIGN PATENT DOCUMENTS

WO   WO 2014036217   3/2014

OTHER PUBLICATIONS

Extended European Search Report for EP 17160151.1-1754, dated Jul. 28, 2017.

*Primary Examiner* — Dung Van Nguyen
(74) *Attorney, Agent, or Firm* — Joseph M. Butscher; The Small Patent Law Group, LLC

(57) ABSTRACT

A system includes a dry floor assembly that is configured to be located within an interior space. The dry floor assembly includes a vacuum layer. A vacuum system is coupled to the vacuum layer. The vacuum system is configured to remove liquid from the dry floor assembly via the vacuum layer.

19 Claims, 10 Drawing Sheets

(56) References Cited

U.S. PATENT DOCUMENTS

| | | | |
|---|---|---|---|
| 6,470,512 B1 * | 10/2002 | Lau | A47K 3/30 |
| | | | 4/612 |
| 7,051,748 B2 * | 5/2006 | VanBasten | G21F 9/22 |
| | | | 137/15.01 |
| 7,131,965 B1 * | 11/2006 | Thornbury | A61M 1/008 |
| | | | 137/312 |
| 8,839,812 B2 * | 9/2014 | Tanhehco | A61G 13/102 |
| | | | 137/312 |
| 9,623,133 B2 * | 4/2017 | Childress | A61L 2/24 |
| 2003/0177572 A1 | 9/2003 | Guerin | |
| 2003/0211291 A1 | 11/2003 | Castiglione | |
| 2006/0041238 A1 | 2/2006 | Bowen | |
| 2014/0115764 A1 | 5/2014 | Cheng | |
| 2014/0230185 A1 | 8/2014 | Burea | |
| 2015/0322656 A1 | 11/2015 | Huang | |

* cited by examiner

SYSTEMS AND METHODS FOR CLEANING A LAVATORY FLOOR

RELATED APPLICATIONS

This application relates to and claims priority benefits from U.S. Provisional Patent Application No. 62/315,999, entitled "Systems and Methods for Cleaning a Lavatory Floor," filed Mar. 31, 2016, which is hereby incorporated by reference in its entirety.

FIELD OF THE DISCLOSURE

Embodiments of the present disclosure generally relate to systems and methods for cleaning a floor, and, more particularly, to systems and methods for drying a floor, such as a lavatory floor within a commercial aircraft.

BACKGROUND OF THE DISCLOSURE

Commercial aircraft are used to transport passengers between various locations. During a flight—particularly a trans-oceanic or other long haul flight-passengers are typically confined within certain areas (for example, cabins) of an aircraft. Various individuals (such as passengers, pilots, flight attendants, and the like) use certain internal portions of an aircraft during a flight. For example, numerous individuals may use a lavatory within an internal cabin during a flight.

As, can be appreciated, with each use, the cleanliness of a lavatory onboard an aircraft may be compromised. Individuals onboard may be sensitive to health risks presented by a frequently-used lavatory onboard an aircraft. Indeed, as each individual uses a lavatory onboard an aircraft, the likelihood of germs and bacteria therein increases.

An aircraft lavatory is generally cleaned between flights. For example, maintenance or cleaning personnel board the aircraft on the ground before and/or after a flight to clean the lavatory. However, during a flight, the lavatory is typically not cleaned, despite the fact that numerous individuals may use the lavatory during the flight. While flight attendants may be able to clean the lavatory, they are usually preoccupied with other duties during the flight. As such, cleaning the lavatory may not be a top priority for flight attendants during a flight or even between flights.

Consequently, the cleanliness of lavatories onboard an aircraft may be compromised, particularly during flights. In general, during a flight, a lavatory onboard an aircraft may become dirty, wet, smelly, and the like due to use by individuals onboard the aircraft during the flight. As such, a flight experience for individuals onboard the aircraft may be negatively impacted.

Moreover, with repeated use, portions of the floor of the lavatory may be covered with liquids. Even after being cleaned, the floor of the lavatory may be wet from cleaning fluids. A wet lavatory floor may be unsettling to individuals, even if they know the floor is clean. That is, a wet floor may give the impression of unsanitary conditions. Further, a wet floor may pose a safety hazard in that an individual may slip and fall on the wet floor.

SUMMARY OF THE DISCLOSURE

A need exists for a system and a method for drying a floor. A need exists for a system and method for automatically drying a floor of a lavatory after use. A need exists for a system and a method for effectively and efficiently drying a lavatory floor onboard an aircraft, particularly during a flight.

With those needs in mind, certain embodiments of the present disclosure provide a dry floor assembly that is configured to form or be positioned on a floor of an enclosed space. The dry floor assembly includes a vacuum layer that is configured to be coupled to a vacuum system. The vacuum system is configured to remove liquid from the dry floor assembly via the vacuum layer.

The vacuum layer may include a port that is configured to fluidly connect to the vacuum system. In at least one embodiment, the vacuum layer includes a plurality of ridges separated by liquid-collection grooves. Vacuum channels are formed through portions of the ridges. The vacuum channels are configured to be in fluid communication with the vacuum system.

The dry floor assembly may include an upper layer positioned over the vacuum layer. The upper layer is formed of and/or coated with a hydrophobic material. The upper layer may include a plurality of openings through which liquid is repelled toward the vacuum layer. In at least one embodiment, the plurality of openings are rectangular.

The dry floor assembly may include a wicking layer positioned between the vacuum layer and the upper layer. The wicking layer may include a plurality of pores. The wicking layer is configured to wick liquid away from the upper layer. The liquid is drawn to the vacuum layer through the plurality of pores. In at least one embodiment, the wicking layer is formed of a wire fabric mesh.

The dry floor assembly may include a lower support layer positioned between the vacuum layer and the wicking layer. The lower support layer may include a plurality of perforations through which the liquid is drawn to the vacuum layer.

Certain embodiments of the present disclosure provide a system that includes a dry floor assembly that is configured to be located within an interior space. The dry floor assembly includes a vacuum layer. A vacuum system is coupled to the vacuum layer. The vacuum system is configured to remove liquid from the dry floor assembly via the vacuum layer. In at least one embodiment, the vacuum system is configured to be activated when a toilet within the interior space is flushed. The system may also include an ultraviolet (UV) light configured to clean the dry floor assembly.

Certain embodiments of the present disclosure provide a method that includes forming a dry floor assembly with a vacuum layer, locating the dry floor assembly within an interior space, coupling the vacuum layer of the dry floor assembly to a vacuum system, and activating the vacuum system to remove liquid from the dry floor assembly via the vacuum layer. In at least one embodiment, the activating operation includes flushing a toilet coupled to the vacuum system. The method may also include refraining from the activating operation when the interior space is occupied by an individual.

In at least one embodiment, the method may also include activating an ultraviolet (UV) light to clean the dry floor assembly. The method may also include refraining from the activating UV light operation when the interior space is occupied by an individual.

Certain embodiments of the present disclosure provide an aircraft that includes a fuselage having an internal cabin. A lavatory is located within the internal cabin. A dry floor assembly is positioned within the lavatory. The dry floor assembly includes a vacuum layer. A vacuum system is secured within a portion of the fuselage. The vacuum system is coupled to the vacuum layer. The vacuum system is configured to remove liquid from the dry floor assembly via the vacuum layer. The vacuum system is configured to be activated when a toilet within the lavatory is flushed. An ultraviolet (UV) light may be positioned within the lavatory. The UV light is configured to clean the dry floor assembly.

DETAILED DESCRIPTION OF THE DISCLOSURE

Figure 1:
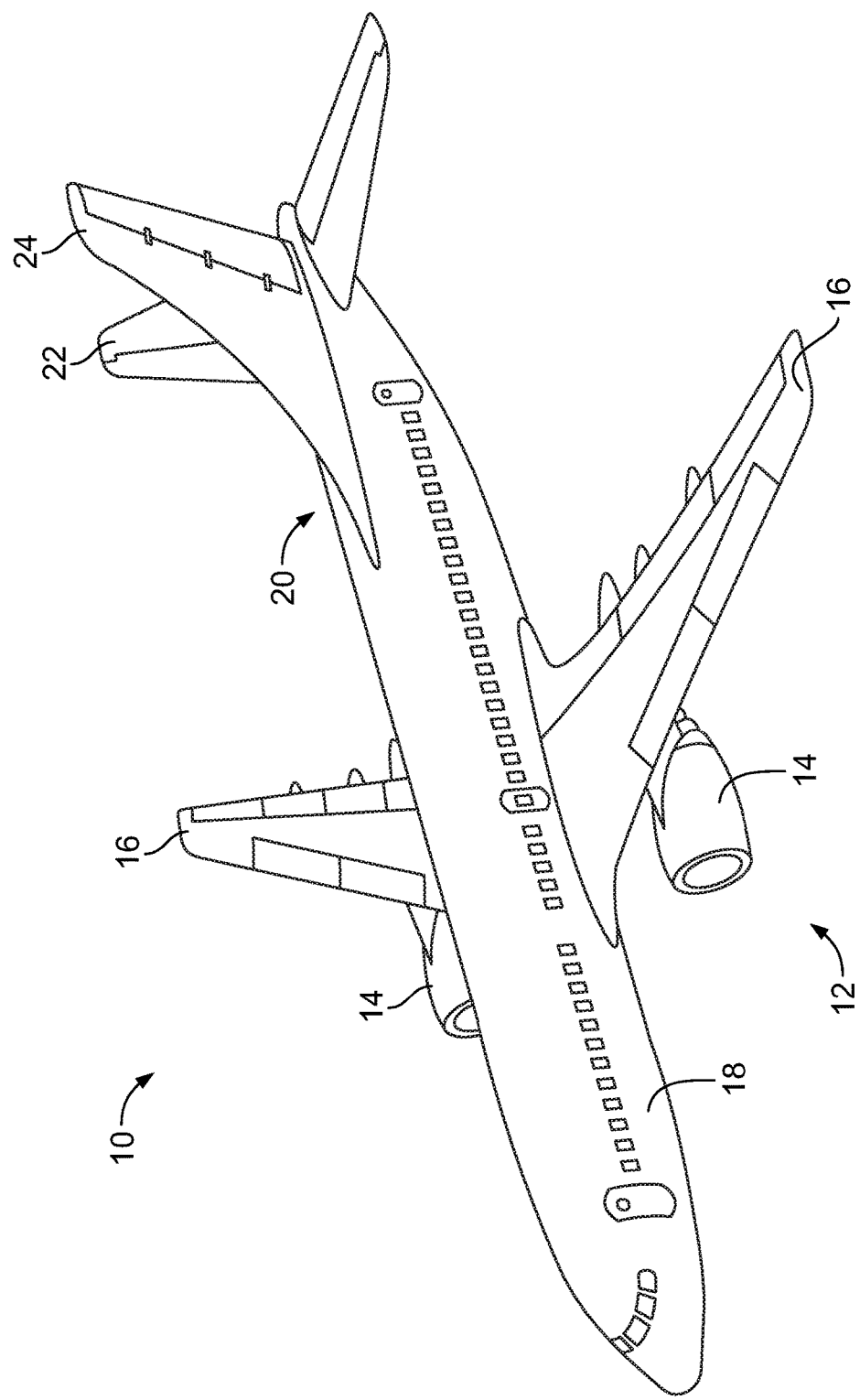
FIG. 1 illustrates a perspective top view of an aircraft, according to an embodiment of the present disclosure.

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition may include additional elements not having that condition.

Embodiments of the present disclosure provide systems, methods, and assemblies for drying a floor, such as a lavatory floor. The systems, methods, and assemblies may be used in various settings, such as within a lavatory of a vehicle, a public washroom in a building, a laboratory, and/or the like.

Certain embodiments of the present disclosure provide a dry floor assembly that eliminates, minimizes, or otherwise reduces the presence of liquids. The dry floor assembly is configured to pull liquids therethrough and direct the liquids to a vacuum system, such as a toilet vacuum system onboard on a vehicle. In at least one embodiment, the dry floor assembly includes an upper layer that is configured to remain dry, a middle layer that wicks water away from the upper layer, and a lower vacuum layer that is configured to be coupled to a vacuum system. When coupled to the vacuum system, the dry floor assembly is automatically dried each time the vacuum system is activated (such as when a toilet is flushed) by virtue of the vacuum system drawing any liquid on or within the dry floor assembly away.

Certain embodiments of the present disclosure provide a drying system that includes a dry floor assembly and a vacuum system. The dry floor assembly includes a plurality of layers, at least one of which is coupled to the vacuum system. At least an upper layer of the dry floor assembly is liquid permeable. An ultraviolet (UV) light may be configured to emit UV light onto the dry floor assembly in order to sterilize the dry floor assembly. In at least one embodiment, the vacuum system may be activated to draw liquid away from the dry floor assembly when an interior chamber (such as a lavatory) in which the dry floor assembly is located is unoccupied. For example, the vacuum system may be activated when a lavatory door is closed, and there is no one inside the lavatory.

Embodiments of the present disclosure provide systems, methods, and assemblies that provide an anti-skid floor that is devoid of liquid. Embodiments of the present disclosure are configured to remove liquid from a floor surface. The floor may be automatically sterilized, such as through UV light irradiation. Further, embodiments of the present disclosure provide a cost effective, lightweight, and easy to manufacture floor assembly.

Certain embodiments of the present disclosure provide a floor drying system that includes a dry floor assembly having one or more layers, and a vacuum system coupled to the dry floor assembly. The vacuum system is configured to remove liquids. The vacuum system may provide a selectable intensity. The dry floor assembly may include at least an upper layer that is permeable to liquids having similar properties as water. A UV light may be configured to operate in tandem with the vacuum system in order to sterilize the dry floor assembly. At least one of the layers is configured to reduce an amount of liquid present or visible from a top side of the dry floor assembly. The vacuum system may be configured to be activated when a lavatory door is closed and the lavatory is unoccupied.

Certain embodiments of the present disclosure provide a method of cleaning a floor that includes closing a door such that a dry floor assembly is enclosed in an unoccupied (that is, without a person present) room, and activating a vacuum system to remove liquid on or within the dry floor assembly. The method may also include sterilizing the dry floor assembly with UV light.

FIG. 1 illustrates a perspective top view of an aircraft 10, according to an embodiment of the present disclosure. The aircraft 10 may include a propulsion system 12 that may include two turbofan engines 14, for example. Optionally, the propulsion system 12 may include more engines 14 than shown. The engines 14 are carried by wings 16 of the aircraft 10. In other embodiments, the engines 14 may be carried by a fuselage 18 and/or an empennage 20. The empennage 20 may also support horizontal stabilizers 22 and a vertical stabilizer 24.

The fuselage 18 of the aircraft 10 defines an internal cabin, which may include a cockpit, one or more work sections (for example, galleys, personnel carry-on baggage areas, and the like), one or more passenger sections (for example, first class, business class, and coach sections), and an aft section in which an aft rest area assembly may be positioned. Each of the sections may be separated by a cabin transition area, which may include one or more class divider assemblies. Overhead stowage bin assemblies may be positioned throughout the internal cabin.

The internal cabin includes one or more lavatories, for example. Embodiments of the present disclosure provide systems and methods that are configured to automatically dry floors within the lavatories.

Alternatively, instead of an aircraft, embodiments of the present disclosure may be used with various other vehicles, such as automobiles, buses, locomotives and train cars, watercraft, spacecraft, and the like. Further, embodiments of the present disclosure may be used with respect to fixed structures, such as commercial and residential buildings. As an example, embodiments of the present disclosure may be used to automatically dry floors of lavatories, whether or not the lavatories are within vehicles.

Figure 2A:
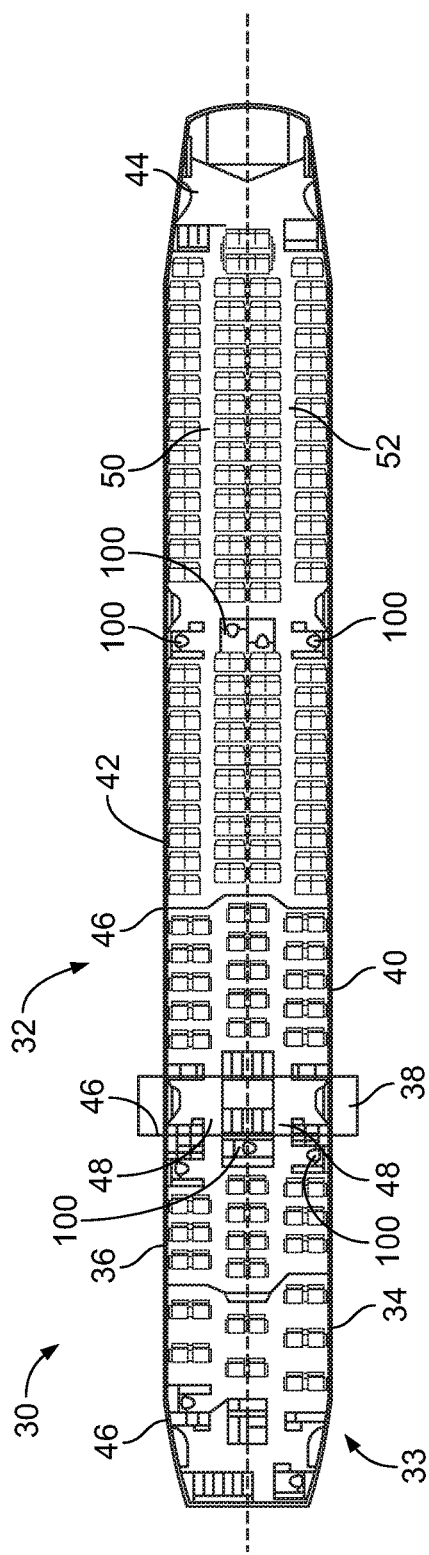
FIG. 2A illustrates a top plan view of an internal cabin of an aircraft, according to an embodiment of the present disclosure.

FIG. 2A illustrates a top plan view of an internal cabin 30 of an aircraft, according to an embodiment of the present disclosure. The internal cabin 30 may be within a fuselage 32 of the aircraft. For example, one or more fuselage walls may define the internal cabin 30. The internal cabin 30 includes multiple sections, including a front section 33, a first class section 34 (or first class suites, cabins, for example), a business class section 36, a front galley station 38, an expanded economy or coach section 40, a standard economy or coach section 42, and an aft section 44, which may include multiple lavatories and galley stations. It is to be understood that the internal cabin 30 may include more or less sections than shown. For example, the internal cabin 30 may not include a first class section, and may include more or less galley stations than shown. Each of the sections may be separated by a cabin transition area 46, which may include class divider assemblies between aisles 48.

As shown in FIG. 2A, the internal cabin 30 includes two aisles 50 and 52 that lead to the aft section 44. Optionally, the internal cabin 30 may have less or more aisles than shown. For example, the internal cabin 30 may include a single aisle that extends through the center of the internal cabin 30 that leads to the aft section 44.

One or more lavatories 100 may be located within the internal cabin 30. The lavatories 100 may include dry floor assemblies that are configured to be coupled to a vacuum system, which may be secured within a portion of the fuselage. The dry floor assemblies are configured to reduce an amount of visible liquid on an exposed top surface. The vacuum system may be activated to draw liquid on or within the dry floor assemblies away.

In operation, a drying system that includes a dry floor assembly is configured to automatically dry the dry floor assembly. The drying system may be configured to dry the dry floor assembly when a toilet within the lavatory is flushed. In at least one embodiment, the drying system may be configured to dry the dry floor assembly when the lavatory is unoccupied by an individual. Additionally, the lavatory may include at least one UV light that is configured to irradiate the dry floor assembly during a cleaning cycle. The UV light rids the dry floor assembly of germs, bacteria, microbes, and/or the like. The UV light is configured to irradiate or otherwise emit UV light onto the dry floor assembly in order to disinfect, sanitize, clean, or otherwise rid the floor of germs, bacteria, microbes, and/or the like. The UV light may be activated when the lavatory is unoccupied.

A presence sensor within, or, or otherwise proximate to the lavatory may be used to detect a presence of an individual within the lavatory. The presence sensor may be or include one or more magnetic switches, motion sensors (such as infrared motion sensors), heat sensors, and/or the like that are configured to detect whether an individual is within the lavatory. For example, the presence sensor may be a magnetic switch coupled to a door of the interior chamber.

Figure 2B:
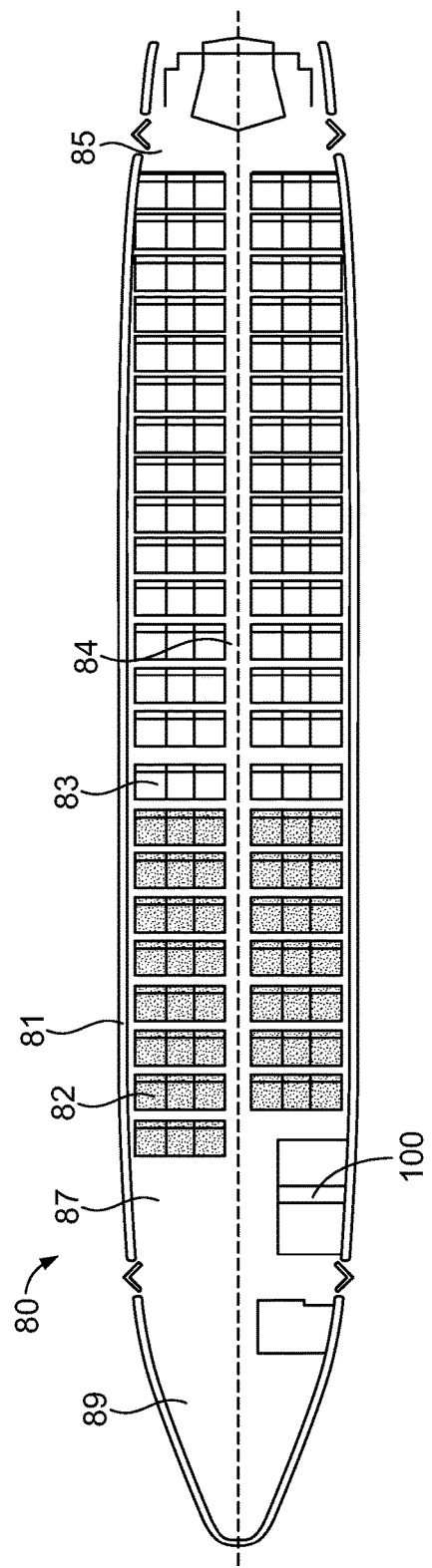
FIG. 2B illustrates a top plan view of an internal cabin of an aircraft, according to an embodiment of the present disclosure.

FIG. 2B illustrates a top plan view of an internal cabin 80 of an aircraft, according to an embodiment of the present disclosure. The internal cabin 80 may be within a fuselage 81 of the aircraft. For example, one or more fuselage walls may define the internal cabin 80. The internal cabin 80 includes multiple sections, including a main cabin 82 having passenger seats 83, and an aft section 85 behind the main cabin 82. It is to be understood that the internal cabin 80 may include more or less sections than shown.

The internal cabin 80 may include a single aisle 84 that leads to the aft section 85. The single aisle 84 may extend through the center of the internal cabin 80 that leads to the aft section 85. For example, the single aisle 84 may be coaxially aligned with a central longitudinal plane of the internal cabin 80.

A dry floor assembly may be located within a lavatory 100 of the main cabin 82 at a fore section 87 proximate to a cockpit area 89. Additional lavatories 100 may be located throughout the main cabin 82.

Figure 3:
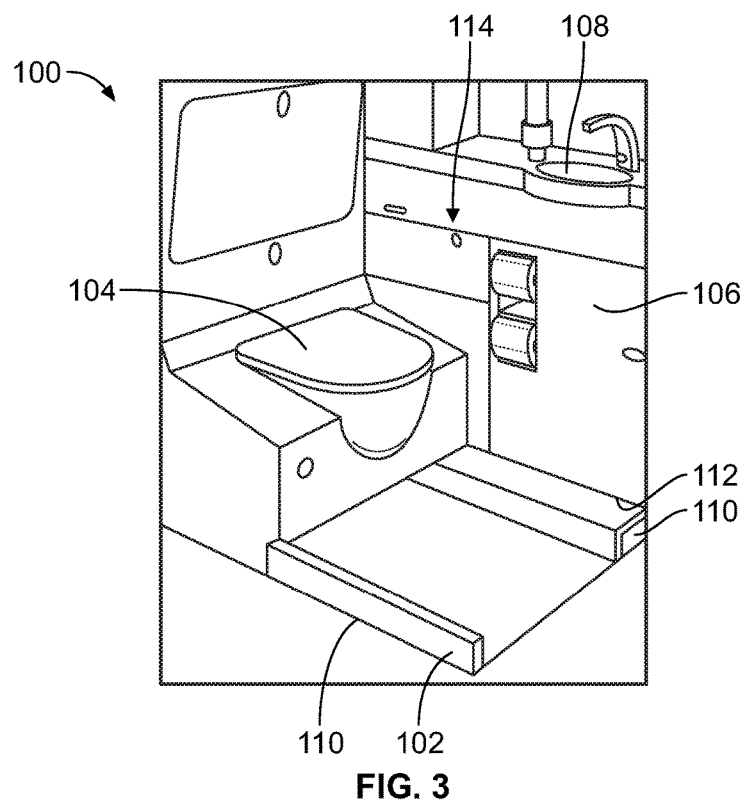
FIG. 3 illustrates a perspective internal view of a lavatory, according to an embodiment of the present disclosure.

FIG. 3 illustrates a perspective internal view of a lavatory 100, according to an embodiment of the present disclosure. The lavatory 100 may be onboard an aircraft, as described above. Optionally, the lavatory 100 may be onboard various other vehicles. In other embodiments, the lavatory 100 may be within a fixed structure, such as a commercial or residential building.

The lavatory 100 includes a base floor 102 that supports a toilet 104, cabinets 106, and a sink 108. The base floor 102 may include opposed brackets 110 that are configured to securely retain a dry floor assembly therebetween. Optionally, the base floor 102 may be or otherwise include the dry floor assembly. A UV light 112 may be positioned at a lower end of the cabinets 106. The UV light 112 is configured to irradiate the dry floor assembly with UV light during a cleaning cycle when an internal space 114 of the lavatory 100 is unoccupied.

Figure 4:
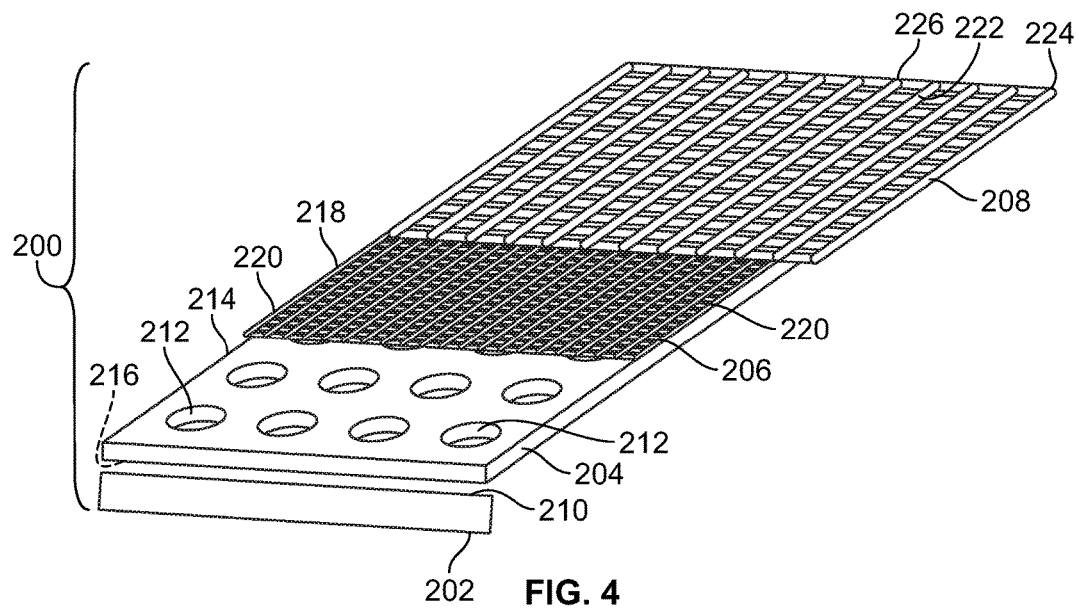
FIG. 4 illustrates a perspective exploded view of a dry floor assembly, according to an embodiment of the present disclosure.

FIG. 4 illustrates a perspective exploded view of a dry floor assembly 200, according to an embodiment of the present disclosure. The dry floor assembly 200 includes a vacuum layer 202 that supports a lower support layer 204. The lower support layer 204, in turn, supports an intermediate wicking layer 206. An upper layer 208 is positioned over the wicking layer 206. The upper layer 208 is configured to be directly engaged by an individual. For example, the individual stands on the upper layer 208. The upper layer 208 may be formed of or otherwise coated with a hydrophobic material.

The vacuum layer 202, the lower support layer 204, the wicking layer 206, and the upper layer 208 are sandwiched together to form the dry floor assembly 200. In at least one embodiment, the vacuum layer 202, the lower support layer 204, the wicking layer 206, and the upper layer 208, may be contained within an outer frame, bracket(s), and/or the like, such as the brackets 110 shown in FIG. 3. The vacuum layer 202, the lower support layer 204, the wicking layer 206, and the upper layer 208 may be secured together with fasteners and/or adhesives, for example. In at least one other embodiment, portions of the layers 202, 204, 206, and 208 may include one or more detents (such as tabs, posts, barbs, snaps, and/or the like) that are configured to securely engage reciprocal structures on adjacent layers 202, 204, 206, and 208 in order to securely connect the layers 202, 204, 206, and 208 together.

The vacuum layer 202 includes features (such as slots, channels, and/or the like) that may be configured to provide a consistent and even vacuum suction force when connected to a vacuum system. For example, a top surface 210 of the vacuum layer 202 is configured to suction liquid through the lower support layer 204, the wicking layer 206, and the upper layer 208 when the vacuum layer 202 is coupled to an activated vacuum system.

The lower support layer 204 may be a planar sheet of metal. For example, the lower support layer 204 may be formed of steel. The lower support layer 204 may include a plurality of perforations 212 (such as holes, openings, channels, or the like) that allow liquid to be drawn therethrough. As shown, the perforations 212 may be circular openings formed through the lower support layer 204. The perforations 212 extend from and through opposed top and bottom surfaces 214 and 216, respectively, of the lower support layer 204. In at least one embodiment, the perforations 212 may have a diameter between 0.1 inches-0.2 inches. For example, the perforations 212 may have a diameter of 0.185 inches. Optionally, the diameter of the perforations may be less than 0.1 inches, or greater than 0.2 inches.

The wicking layer 206 may be formed of a wire fabric mesh 218 having liquid wicking properties. In at least one embodiment, the fabric mesh 218 may be formed of stainless steel. The wicking layer 206 provides a wicking fabric and/or metal screen that wicks liquid in a similar manner as a fabric wicks liquid. The mesh 218 has a plurality of pores 220 formed therethrough. The pores 220 have a porosity that is configure to allow vacuum pressure to pull liquid therethrough. In at least one embodiment, each pore 220 may have a diameter or span of approximately 180 microns. Alternatively, each pore 220 may have a diameter or span that is greater or less than 180 microns.

The upper layer 208 may be a stainless steel screen 222 that is coated with a hydrophobic coating 224. The screen 222 provides openings 226 therethrough that are larger than the pores 220. The relatively large openings 226 are configured to prevent or otherwise reduce liquid beading on the upper layer 208. The hydrophobic coating 224 repels liquids from the upper layer 208, thereby ensuring that the upper layer 208 is dry. In at least one embodiment, the openings 226 may be rectangular or otherwise non-circular, which allow liquid to pass therethrough and are less susceptible to liquid bridging due to liquid surface tension. In at least one other embodiment, the upper layer 208 may be formed entirely of a hydrophobic material.

In operation, liquid deposited onto the upper layer 208 is repelled by the hydrophobic coating 224 and passes through the openings 226. The wicking layer 206 draws the liquid away from the upper layer 208. An activated vacuum system coupled to the vacuum layer 202 suctions the liquid on or within the wicking layer 206 through the pores 220. The liquid then passes through the perforations 212 of the lower support layer 204 and out of the dry floor assembly 200 through an outlet that fluidly connects to the vacuum system through a conduit (such as a hose, tube, or the like).

Alternatively, the dry floor assembly 200 may not include the lower support layer 204 and/or the wicking layer 206. Instead, the upper layer 208 may be supported directly by the vacuum layer 202. In at least one other embodiment, the vacuum layer 202 may be configured to directly support an individual. As such, the dry floor assembly 200 may not include the lower support layer 204, the wicking layer 206, or the upper layer 208.

Figure 5:
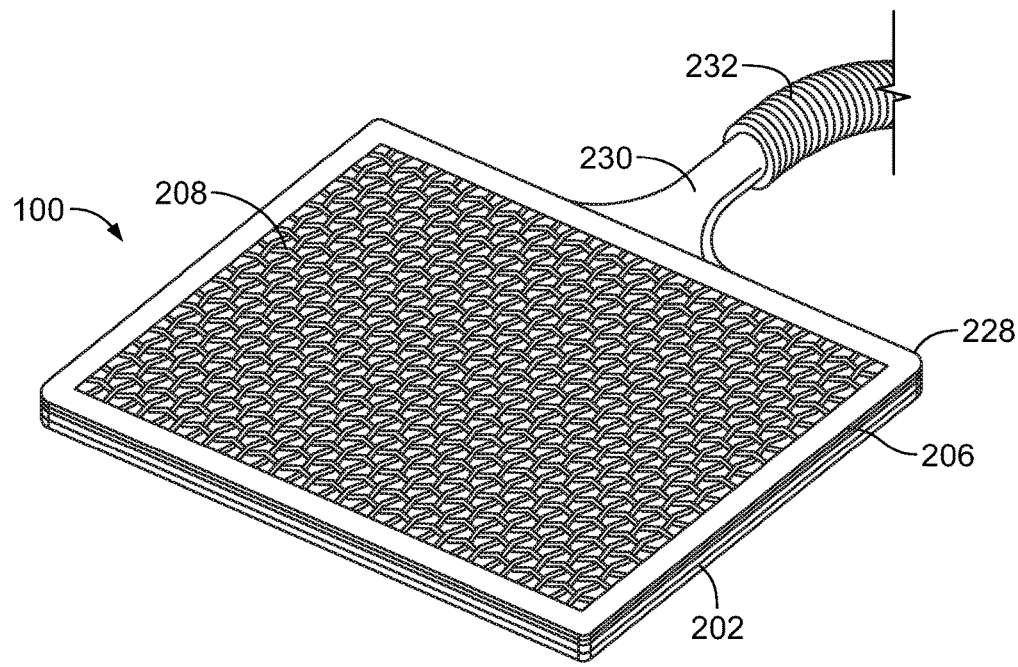
FIG. 5 illustrates a perspective top view of a dry floor assembly, according to an embodiment of the present disclosure.
Figure 6:
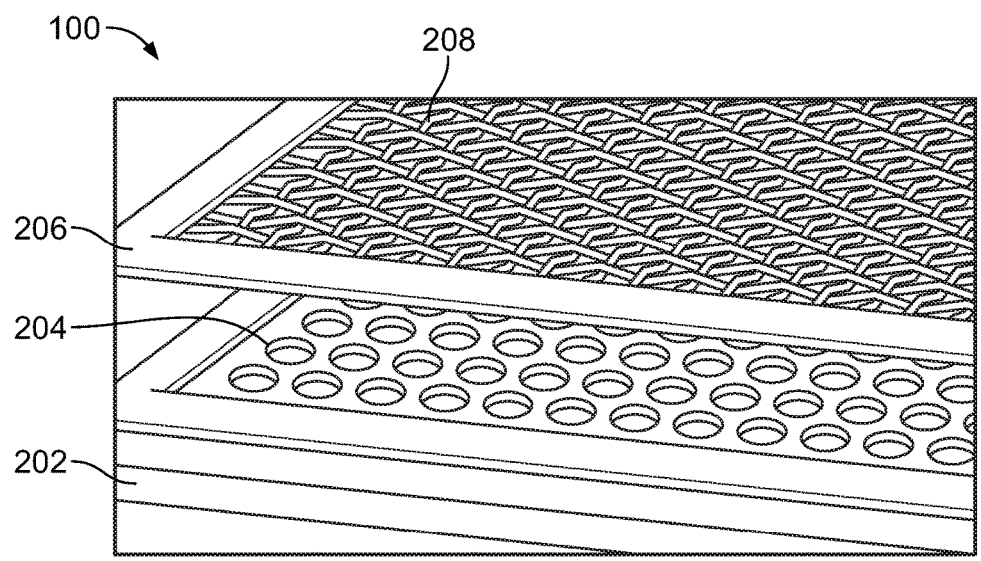
FIG. 6 illustrates a perspective lateral view of a dry floor assembly, according to an embodiment of the present disclosure.

FIG. 5 illustrates a perspective top view of the dry floor assembly 200. FIG. 6 illustrates a perspective lateral view of the dry floor assembly 200. Referring to FIGS. 5 and 6, the dry floor assembly 200 may include a retaining bracket 228 that sandwiches the lower support layer 204 and the wicking layer 206 between the vacuum layer 202 and the upper layer 208. The bracket 228 may be part of or otherwise integrally connected to one or both of the vacuum layer 202 and/or the lower support layer 204.

The vacuum layer 202 includes a port 230 that is in fluid communication with the vacuum channels (hidden from view in FIGS. 5 and 6). The port 230 connects to a conduit 232 (such as a hose, tube, pipe, or the like) that connects to a vacuum system (not shown in FIGS. 5 and 6). Accordingly, when the vacuum system is activated, a vacuum force (or suction force) is generated that draws liquid on or within the dry floor assembly 100 out of the dry floor assembly 100 and into the conduit 232.

Figure 7:
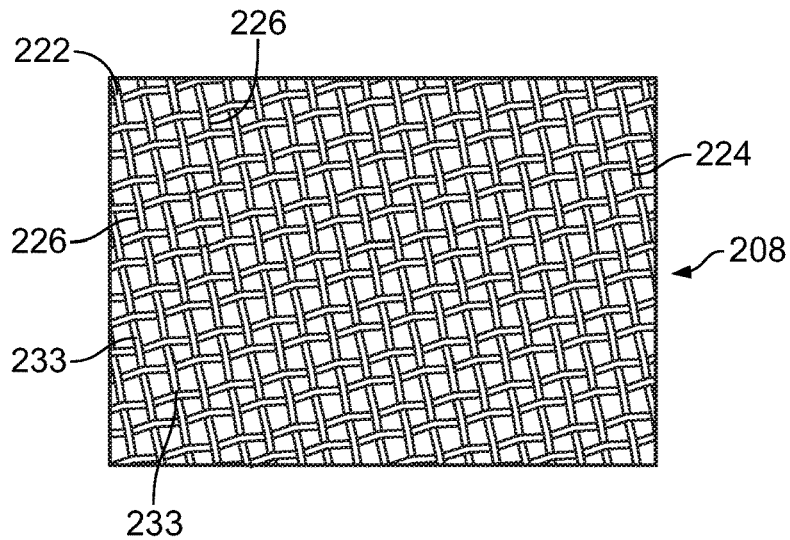
FIG. 7 illustrates a top view of an upper layer, according to an embodiment of the present disclosure.

FIG. 7 illustrates a top view of the upper layer 208, according to an embodiment of the present disclosure. As noted, the upper layer 208 includes the screen 222 that is coated with the hydrophobic coating 224. As shown, the openings 226 may be formed as squares or other rectangular shapes. The openings 226 are substantially larger than the thickness of the wires 233 that form the screen 222. The rectangular openings 226 allow liquid to pass therethrough and are less susceptible to liquid bridging due to liquid surface tension. That is, the openings 226 are generally large enough to eliminate, minimize, or reduce the possibility of liquid bridging between adjacent wires 233.

Figure 8:
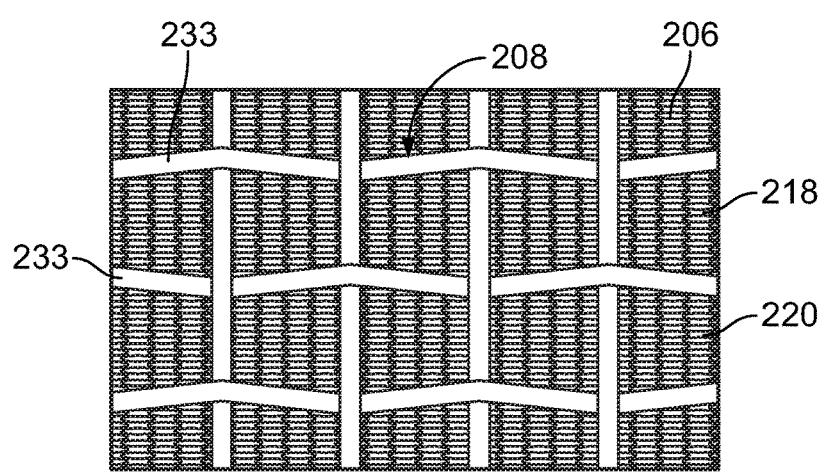
FIG. 8 illustrates a top view of an upper layer overlaying a wicking layer, according to an embodiment of the present disclosure.

FIG. 8 illustrates a top view of the upper layer 208 overlaying the wicking layer 206, according to an embodiment of the present disclosure. The upper layer 208 and the wicking layer 206 may be formed as a single piece. For example, the upper layer 208 may be bonded over the wicking layer 206. Optionally, the upper layer 208 may not be bonded to the wicking layer 206.

The wicking layer 206 may be formed of or otherwise include the wire fabric mesh 218 having liquid wicking properties. In at least one embodiment, the fabric mesh 218 may be formed of stainless steel. The pores 220 are formed through the mesh 218. As shown, the pores 220 are substantially smaller than the openings 226 formed through the upper layer 208. Approximately 10-30 pores 220 may fit within an area that is the same size as the area of an opening 226 formed through the upper layer 208. Alternatively, the pores 220 may be larger or smaller than shown.

Figure 9:
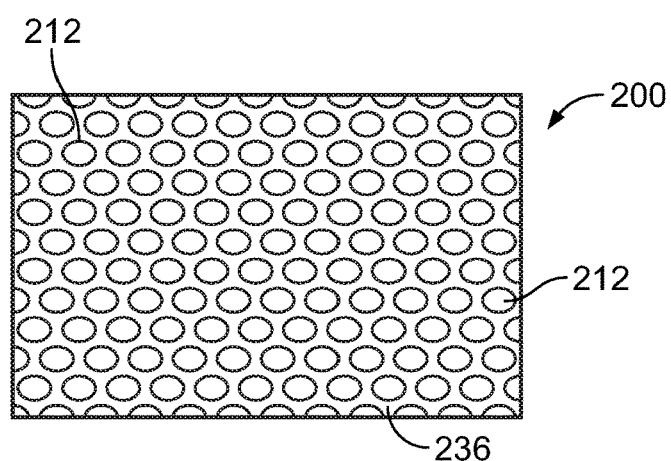
FIG. 9 illustrates a top view of a lower support layer, according to an embodiment of the present disclosure.

FIG. 9 illustrates a top view of the lower support layer 204, according to an embodiment of the present disclosure. The lower support layer 204 may be formed of a planar sheet of metal, and include a panel 236 having the plurality of perforations 212 (such as holes, openings, channels, or the like) formed therethrough. As shown, the perforations 212 may be circular openings. Optionally, the perforations 212 may be sized and shaped differently than shown. In at least one embodiment, the perforations 212 may be shaped as rectangles, similar to the upper layer 208.

Figure 10:
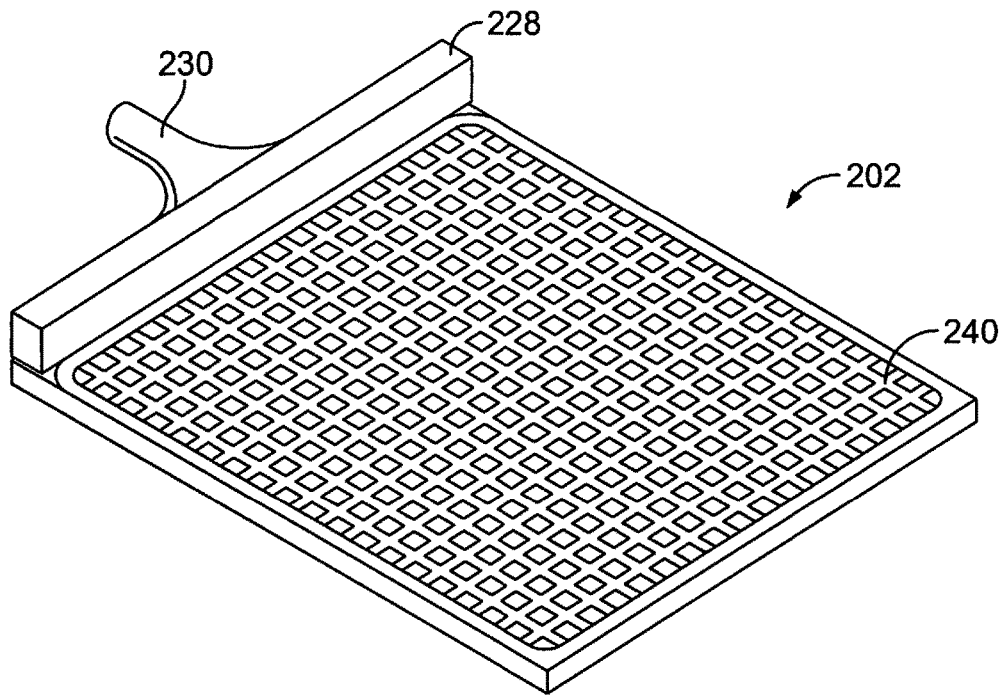
FIG. 10 illustrates a perspective bottom view of a vacuum layer, according to an embodiment of the present disclosure.

FIG. 10 illustrates a perspective bottom view of the vacuum layer 200, according to an embodiment of the present disclosure. The vacuum layer 200 includes a planar support base 240 that is configured to abut into a base floor surface, such as that within a lavatory.

Figure 11:
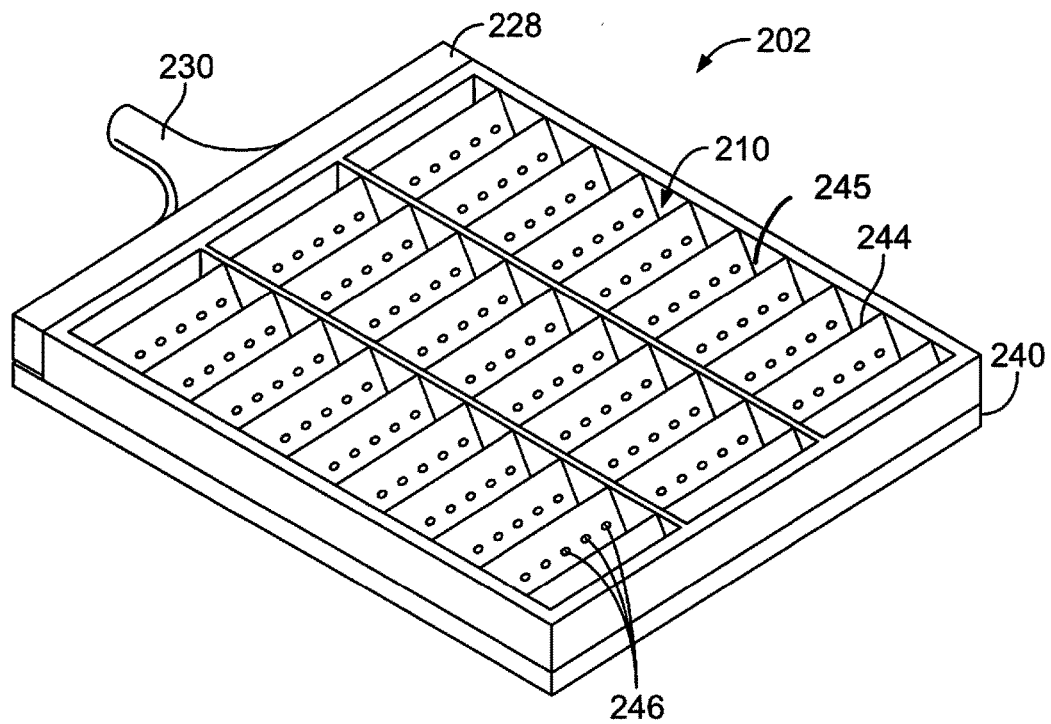
FIG. 11 illustrates a perspective top view of a vacuum layer, according to an embodiment of the present disclosure.

FIG. 11 illustrates a perspective top view of the vacuum layer 200, according to an embodiment of the present disclosure. The top surface 210 of the vacuum layer 200 includes a plurality of ridges 244 (which may be aligned and parallel) separated by liquid-collection grooves 245 therebetween. Vacuum channels 246 (such as openings) are formed through surfaces of the ridges 244. The vacuum channels 246 are in communication with the vacuum port 230. As such, liquid that collects in the grooves 245 may be suctioned into the vacuum port 230 by way of the vacuum channels 246 when a vacuum system is operatively coupled to the vacuum port 230 and activated.

Figure 12:
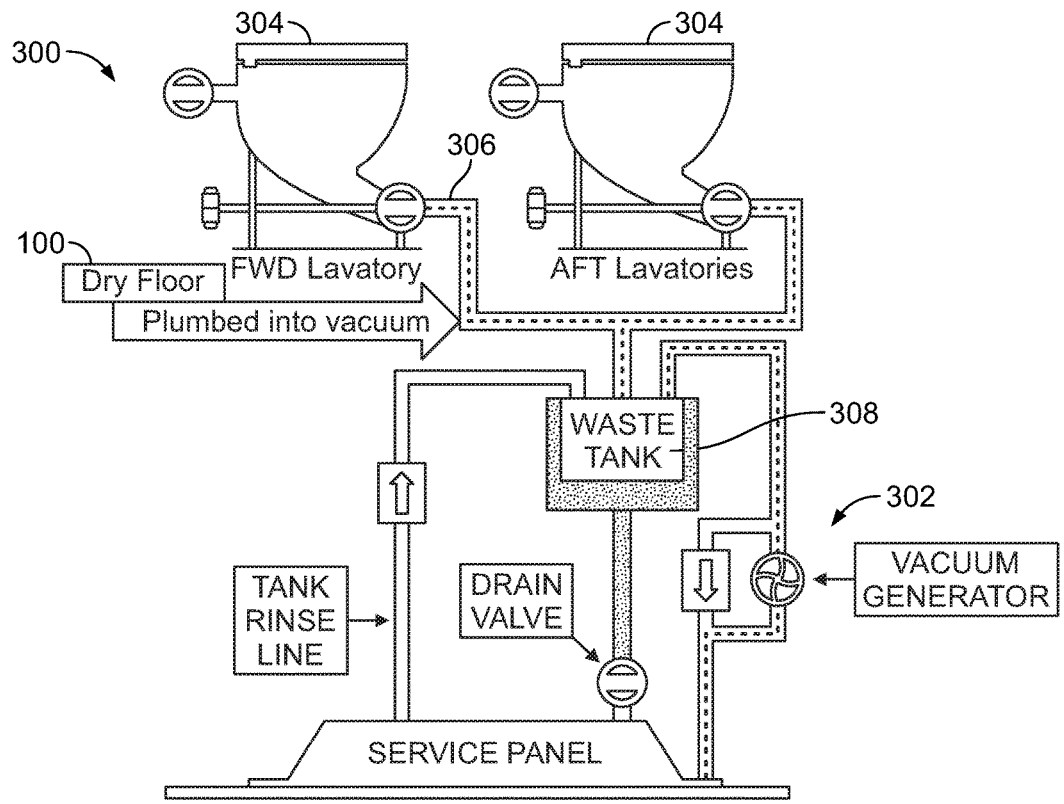
FIG. 12 illustrates a schematic diagram of a drying system, according to an embodiment of the present disclosure.

FIG. 12 illustrates a schematic diagram of a drying system 300, according to an embodiment of the present disclosure. The drying system 300 may be onboard a vehicle, such as an aircraft. The drying system 300 may include the dry floor assembly 100 coupled to a vacuum system 302 that may be operatively coupled to one or more toilets 304. The vacuum system 302 may be secured within a portion of a vehicle, such as within a fuselage of an aircraft.

The dry floor assembly 100 is fluidly connected to one or more fluid-conveying conduits 306 that are connected to the toilet(s) 304 and the vacuum system 302. For example, the vacuum port 230 of the vacuum layer 202 (shown in FIGS. 10 and 11) is fluidly coupled to the conduit(s) 306. Accordingly, when the vacuum system 302 is activated (that is, when the vacuum system 302 generates a vacuum or suction force through the conduits 306), the ensuing vacuum or suction force draws liquid on and/or within the dry floor assembly 100 into the conduit(s) 306 and into a waste tank 308.

The vacuum system 302 may be activated when a toilet 304 adjacent or otherwise proximate to the dry floor assembly is flushed. In at least one other embodiment, the vacuum system 302 may be activated when a lavatory in which the toilet 304 is located is unoccupied. For example, an individual may engage a button or lever on the toilet 304 to flush the toilet, but the drying system 300 may be configured such that the toilet 304 flushes (thereby activating the vacuum system 302) after the individual leaves the lavatory (such as when the individual unlocks and closes the door to the lavatory).

Figure 13:
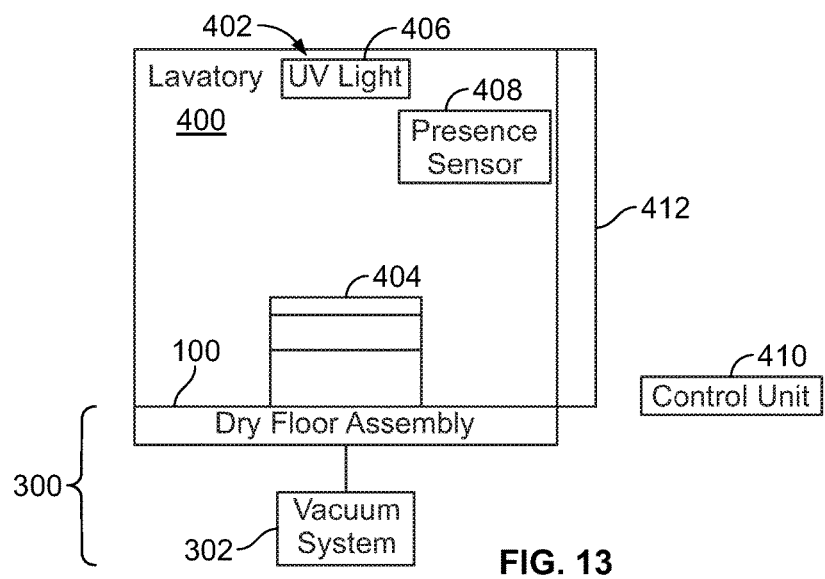
FIG. 13 illustrates a schematic diagram of a lavatory coupled to a drying system and a floor sterilizing system, according to an embodiment of the present disclosure.

FIG. 13 illustrates a schematic diagram of a lavatory 400 coupled to a drying system 300 and a floor sterilizing system 402, according to an embodiment of the present disclosure. The drying system 300 may include the dry floor assembly 100 coupled to the vacuum system 302, as described above. The dry floor assembly 100 may support or may be positioned around at least a portion of a toilet 404. The floor sterilizing system 402 may include a UV light 406 and a presence sensor 408 in communication with a control unit 410 through one or more wired or wireless connections. The control unit 410 may also be in communication with the vacuum system 302 through one or more wired or wireless connections.

The control unit 410 is configured to control operation of the floor sterilizing system 402. The control unit 410 receives presence signals from the presence sensor 408 that indicate whether or not an individual is within the lavatory 400. The presence sensor 408 may be or include one or more magnetic switches, motion sensors (such as infrared motion sensors), heat sensors, and/or the like that are configured to generate presence signals indicative of whether or not an individual is within the lavatory. For example, the presence sensor may be a magnetic switch coupled to a door 412 of the lavatory 400. When the control unit 410 determines that the lavatory 400 is occupied, such as through one or more signals received from the presence sensor 408, the control unit 410 refrains from activating the UV light 406. After the individual leaves the lavatory 400, and the control unit 410 determines that the lavatory 400 is unoccupied (through one or more signals received from the presence sensor 408), the control unit 410 activates the UV light 406 to sanitize or otherwise clean the dry floor assembly 100 and/or other surfaces within the lavatory 400.

The dry floor assembly 100 may be dried through operation of the vacuum system 302 each time the toilet 404 is flushed, as described above. In at least one other embodiment, the control unit 410 may be in communication with the vacuum system 302 and refrain from activating the vacuum system 302 when an individual is within the lavatory 400. After an individual leaves the lavatory 400, and the control unit 410 determines that the lavatory 400 is unoccupied, the control unit 410 may activate the vacuum system to flush the toilet 404 and suction liquid from the dry floor assembly 100.

As described above, the control unit 410 may be configured to control operation of the floor sterilizing system 402 to sterilize, disinfect, or otherwise clean the dry floor assembly 100 and/or the vacuum system 302 to remove liquid from the dry floor assembly 100. As used herein, the term "control unit," "unit," "central processing unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the control unit 410 may be or include one or more processors that are configured to control operation of the floor sterilizing system 402 and/or the vacuum system 302.

The control unit 410 is configured to execute a set of instructions that are stored in one or more storage elements (such as one or more memories), in order to process data. For example, the control unit 410 may include or be coupled to one or more memories. The storage elements may also store data or other information as desired or needed. The storage elements may be in the form of an information source or a physical memory element within a processing machine.

The set of instructions may include various commands that instruct the control unit 410 as a processing machine to perform specific operations such as the methods and processes of the various embodiments of the subject matter described herein. The set of instructions may be in the form of a software program. The software may be in various forms such as system software or application software. Further, the software may be in the form of a collection of separate programs, a program subset within a larger program or a portion of a program. The software may also include modular programming in the form of object-oriented programming. The processing of input data by the processing machine may be in response to user commands, or in response to results of previous processing, or in response to a request made by another processing machine.

The diagrams of embodiments herein may illustrate one or more control or processing units, such as the control unit 410. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the control unit 410 may represent processing circuitry such as one or more of a field programmable gate array (FPGA), application specific integrated circuit (ASIC), microprocessor(s), and/or the like. The circuits in various embodiments may be configured to execute one or more algorithms to perform functions described herein. The one or more algorithms may include aspects of embodiments disclosed herein, whether or not expressly identified in a flowchart or a method.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

Figure 14:
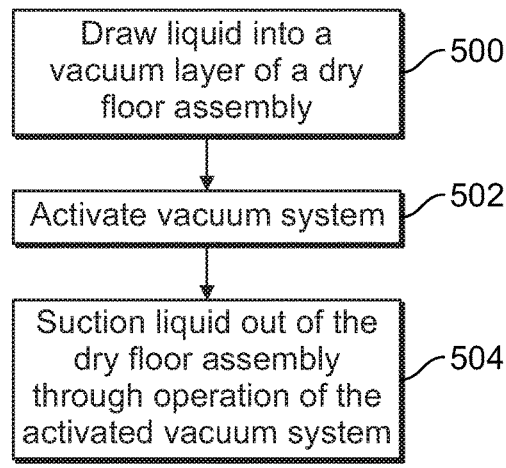
FIG. 14 illustrates a flow chart of a method of drying a dry floor assembly, according to an embodiment of the present disclosure.

FIG. 14 illustrates a flow chart of a method of drying a dry floor assembly, according to an embodiment of the present disclosure. At 500, liquid is drawn into a vacuum layer of a dry floor assembly. For example, a hydrophobic upper layer (such as the upper layer 208) repels liquid into and through openings formed therethrough. The liquid is drawn towards and onto a wicking layer (such as the wicking layer 206). The liquid may then drain and/or be drawn through pores formed through the wicking layer into the vacuum layer (such as the vacuum layer 202).

Next, at 502, a vacuum system that is coupled to the vacuum layer is activated. For example, the vacuum system may be activated when a toilet is flushed. Optionally, the vacuum system may be activated by a control unit, such as when the control unit determines that the lavatory is unoccupied. At 504, the liquid is suctioned out of the dry floor assembly through operation of the activated vacuum system.

Figure 15:
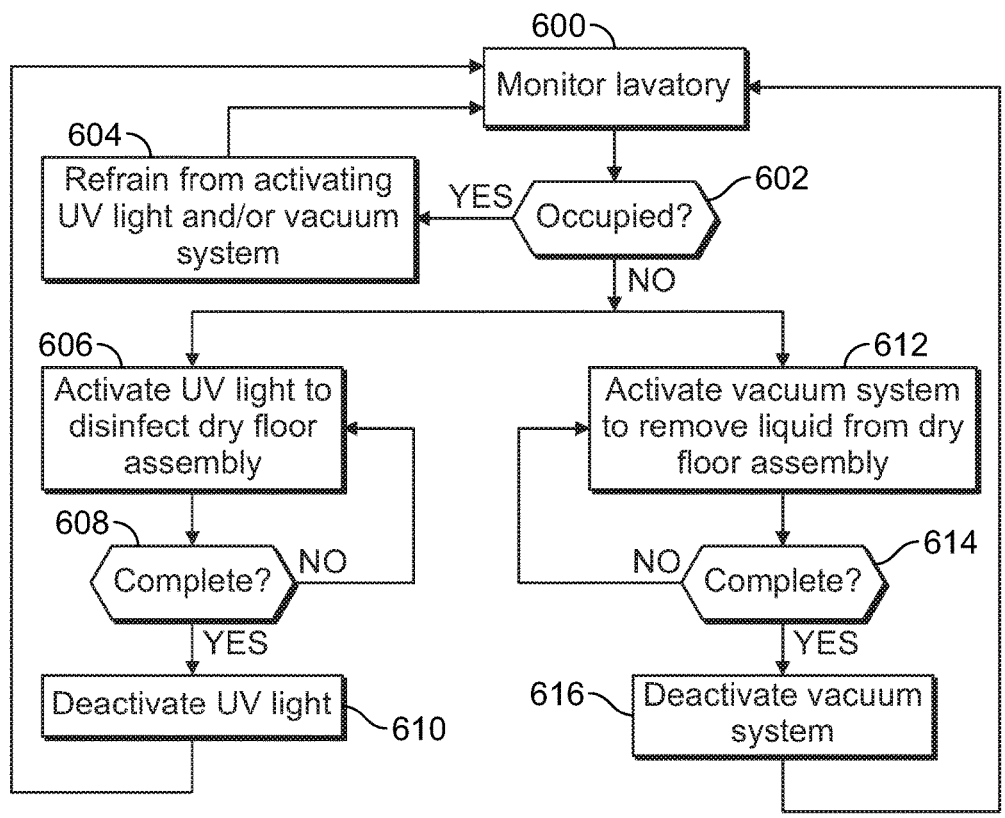
FIG. 15 illustrates a flow chart of a method of sanitizing and drying a dry floor assembly within an enclosed space, according to an embodiment of the present disclosure.

FIG. 15 illustrates a flow chart of a method of sanitizing and drying a dry floor assembly within an enclosed space (such as a lavatory), according to an embodiment of the present disclosure. The method begins at 600, in which the lavatory is monitored. The control unit 410 (shown in FIG. 13) may monitor the lavatory to determine whether it is occupied or unoccupied, such as through analyzing signals received from a presence sensor. The control unit 410 may also monitor the lavatory to determine whether or not to disinfect and/or dry a dry floor assembly therein. For example, the control unit 410 may store data regarding a cleaning schedule and disinfect or otherwise initiate the cleaning cycle based on the schedule.

At 602, the control unit 410 determines whether the lavatory is occupied. If the lavatory is occupied, the method proceeds to 504, in which the control unit 410 refrains from activating a UV light of a floor sterilization system and/or a vacuum system of a drying system. The method then returns to 600.

At 602, if the lavatory is unoccupied, the control unit 410 may activate the UV light to sterilize, disinfect, or otherwise clean the dry floor assembly. At 608, the control unit 410 determines whether the cleaning cycle is complete. For example, the cleaning cycle may be complete after a predetermined effective cleaning time period has elapsed. The predetermined effective cleaning time period may be stored in a memory of the control unit 410. If the cleaning cycle is not complete, the method returns to 606 (that is, the UV light is still active). If, however, the cleaning cycle is complete at 608, the control unit 410 deactivates the UV light 610, and the method returns to 600.

If the lavatory is unoccupied at 602, the method may also proceed from 602 to 612, in which the control unit 410 activates the vacuum system to remove liquid from the dry floor assembly. Steps 606 and 612 may start at the same or approximately the same time. Optionally, step 606 may occur before or after 612. In at least one other embodiment, the control unit 410 may not be in control of the vacuum system. Instead, the vacuum system may be automatically activated each time a toilet is flushed.

At 614, it is determined whether the drying cycle is complete. The drying cycle may last for a predetermined time period that is stored in a memory of the control unit 410. In at least one other embodiment, the drying cycle may be a period of time in which the toilet flushes to remove contents therein. That is, the drying cycle may be dictated by the time it takes to completely flush a toilet.

If the drying cycle is not complete, the method returns to 612 from 614. If, however, the drying cycle is complete, the vacuum system is deactivated at 616, and the method returns to 600.

Figure 16:
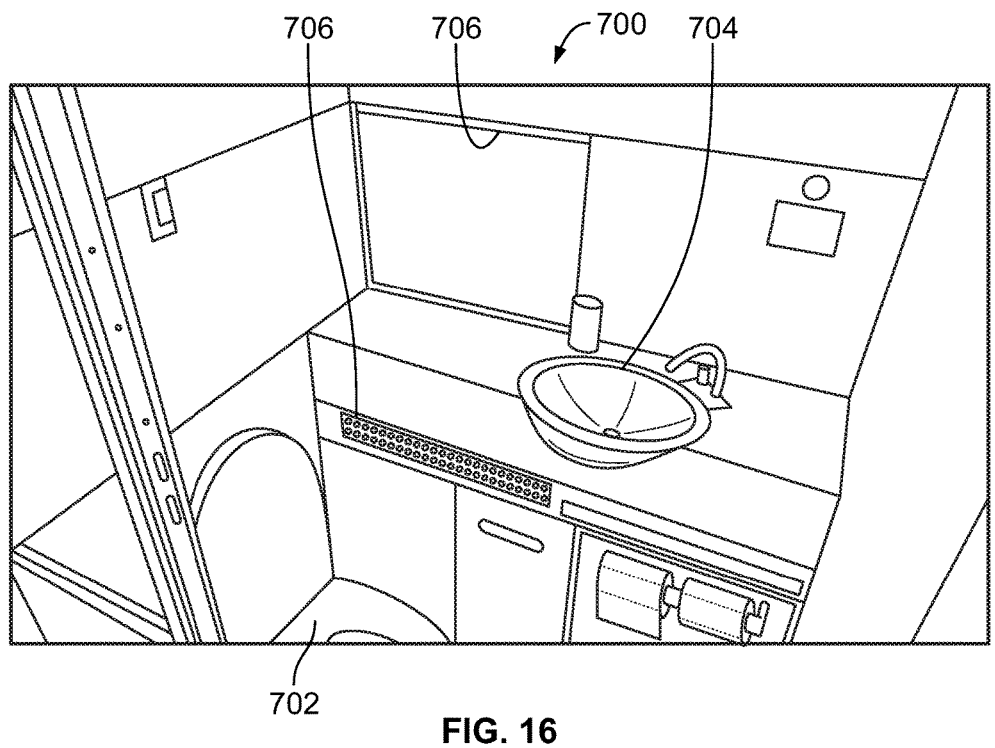
FIG. 16 illustrates a perspective top internal view of a lavatory, according to an embodiment of the present disclosure.

FIG. 16 illustrates a perspective top internal view of a lavatory 700, according to an embodiment of the present disclosure. The lavatory 700 is configured to be secured within a vehicle, such as an aircraft. The lavatory 700 includes a toilet 702, a sink 704, and one or more ultraviolet lights 706 that are configured to emit ultraviolet light into the lavatory 700 during a UV cleaning cycle when the lavatory 700 is unoccupied. The UV cleaning cycle may occur at the same time, or at a different time than the drying cycle described above. The lavatory 700 may also include a dry floor assembly, such as those described above.

Figure 17:
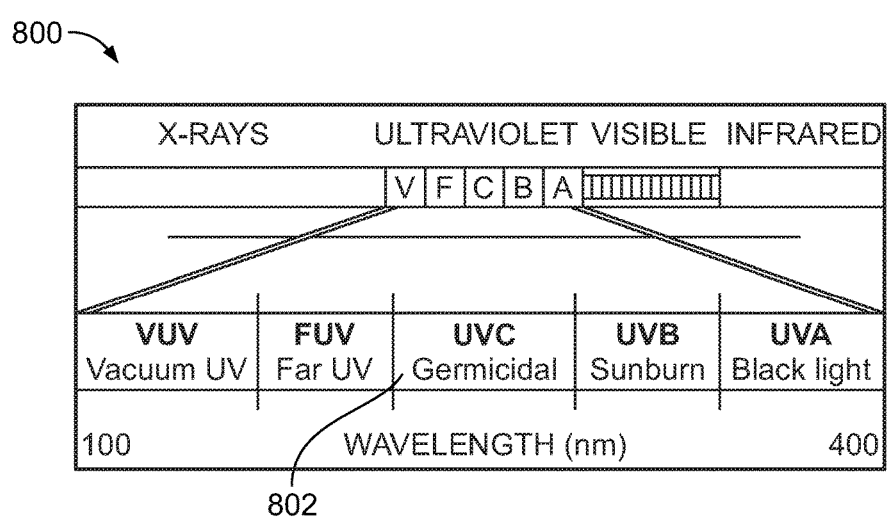
FIG. 17 illustrates a far ultraviolet spectrum.

FIG. 17 illustrates a far ultraviolet spectrum 800. Embodiments of the present disclosure may emit light within the far ultraviolet spectrum 800 to sanitize interior portions of a lavatory, for example. In particular, embodiments of the present disclosure may emit light within a germicidal UVC portion 802 of the spectrum 800. It has been found that by emitting UV light in the far ultraviolet spectrum 800, the ultraviolet lights of embodiments of the present disclosure provide cleaning cycles that are extremely fast and efficient (for example, lasting 2-3 seconds). Embodiments of the present disclosure provide ultraviolet cleaning systems and methods that are configured to sterilize surfaces within the lavatory within seconds.

Figure 18:
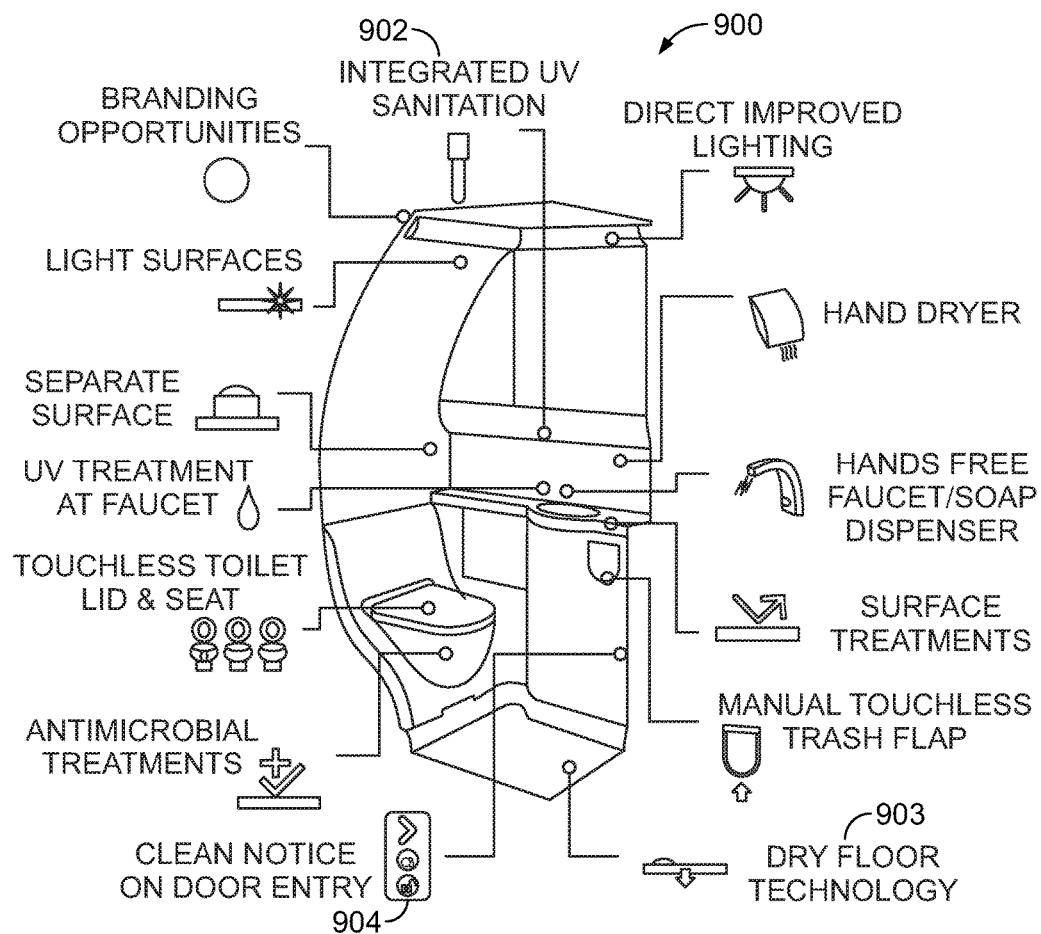
FIG. 18 illustrates a schematic interior view of a lavatory, according to an embodiment of the present disclosure.

FIG. 18 illustrates a schematic interior view of a lavatory 900, according to an embodiment of the present disclosure. The lavatory 900 may include an integrated far UV sanitation system 902, which may include one or more UV lights that are configured to emit light into the lavatory 900 during a cleaning cycle (such as when the lavatory is unoccupied). The lavatory 900 may also include a dry floor assembly 903, such as those described above.

A status indicator 904 may also be positioned on a door or frame of the lavatory 900. The status indicator 904 is configured to provide status information regarding a cleaning cycle (such as a UV cleaning cycle, and/or a drying cycle). Various surfaces within the lavatory 900 may be coated or otherwise treated with antimicrobial materials, titanium dioxide, and/or the like.

Figure 19:
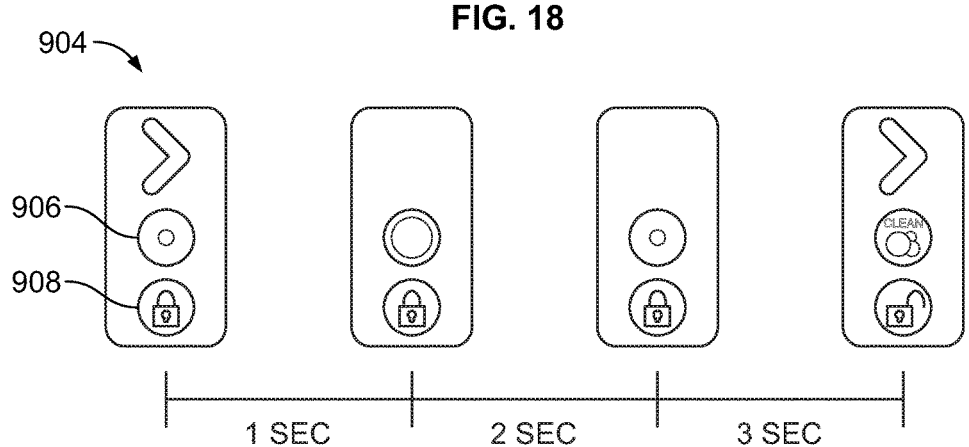
FIG. 19 illustrates a front view of a status indicator during a cleaning cycle, according to an embodiment of the present disclosure.

FIG. 19 illustrates a front view of the status indicator 904 during a cleaning cycle, according to an embodiment of the present disclosure. The status indicator 904 includes a cleaning status light 906 (such as one or more light emitting diodes) and a lock light 908 (such as one or more light emitting diodes). During a UV cleaning cycle, the cleaning status light 906 may change to indicate a cleaning spectrum (from unclean to clean, for example). During the cleaning cycle, the door of the lavatory may be locked, which is indicated by the lock light 908. After the cleaning cycle, the lock light 908 indicates that the door is unlocked. As shown in FIG. 19, the UV cleaning process may last just a few seconds. Optionally, the cleaning process may be shorter or longer than shown in FIG. 19.

As described above, embodiments of the present disclosure provide systems and methods for efficiently and effectively cleaning surfaces within interior chambers, such as lavatories. Embodiments of the present disclosure provide systems and methods for drying a floor. Embodiments of the present disclosure provide systems and methods for automatically drying a floor of a lavatory after use. Embodiments of the present disclosure provide systems and methods for effectively and efficiently drying a lavatory floor onboard an aircraft, particularly during a flight. Embodiments of the present disclosure provide systems and methods that are configured to clean interior spaces, such as those of an aircraft.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A dry floor assembly that is configured to form or be positioned on a floor of an enclosed space, the dry floor assembly comprising:
   a vacuum layer configured to be coupled to a vacuum system, wherein the vacuum system is configured to remove liquid from the dry floor assembly via the vacuum layer,
   wherein the vacuum layer comprises a plurality of ridges separated by liquid-collection grooves, wherein vacuum channels are formed through portions of the ridges, and wherein the vacuum channels are configured to be in fluid communication with the vacuum system.

2. The dry floor assembly of claim 1, wherein the vacuum layer comprises a port that is configured to fluidly connect to the vacuum system.

3. The dry floor assembly of claim 1, further comprising an upper layer positioned over the vacuum layer, wherein the upper layer is one or both of formed of or coated with a hydrophobic material, and wherein the upper layer comprises a plurality of openings through which liquid is repelled toward the vacuum layer.

4. The dry floor assembly of claim 3, wherein the plurality of openings are rectangular.

5. The dry floor assembly of claim 3, further comprising a wicking layer positioned between the vacuum layer and the upper layer, wherein the wicking layer comprises a plurality of pores, wherein the wicking layer is configured to wick liquid away from the upper layer, and wherein the liquid is drawn to the vacuum layer through the plurality of pores.

6. The dry floor assembly of claim 5, wherein the wicking layer is formed of a wire fabric mesh.

7. The dry floor assembly of claim 5, further comprising a lower support layer positioned between the vacuum layer and the wicking layer, wherein the lower support layer comprises a plurality of perforations through which the liquid is drawn to the vacuum layer.

8. A system comprising:
a dry floor assembly that is configured to be located within an interior space, wherein the dry floor assembly comprises a vacuum layer, wherein the vacuum layer comprises a plurality of ridges separated by liquid-collection grooves, wherein vacuum channels are formed through portions of the ridges;
a vacuum system coupled to the vacuum layer, wherein the vacuum channels are in fluid communication with the vacuum system, wherein the vacuum system is configured to remove liquid from the dry floor assembly via the vacuum layer, wherein the vacuum system is configured to be activated when a toilet within the interior space is flushed; and
an ultraviolet (UV) light configured to clean the dry floor assembly.

9. The system of claim 8, wherein the dry floor assembly further comprises:
an upper layer positioned over the vacuum layer, wherein the upper layer is one or both of formed of or coated with a hydrophobic material, and wherein the upper layer comprises a plurality of openings through which liquid is repelled toward the vacuum layer;
a wicking layer positioned between the vacuum layer and the upper layer, wherein the wicking layer comprises a plurality of pores, wherein the wicking layer is configured to wick liquid away from the upper layer, and wherein the liquid is drawn to the vacuum layer through the plurality of pores; and
a lower support layer positioned between the vacuum layer and the wicking layer, wherein the lower support layer comprises a plurality of perforations through which the liquid is drawn to the vacuum layer.

10. The system of claim 8, wherein the vacuum layer further comprises a port that fluidly connects to the vacuum system.

11. A method comprising:
forming a dry floor assembly with a vacuum layer;
locating the dry floor assembly within an interior space;
coupling the vacuum layer of the dry floor assembly to a vacuum system; and
removing liquid from the dry floor assembly via the vacuum layer, wherein the removing liquid operation comprises activating the vacuum system by flushing a toilet coupled to the vacuum system.

12. The method of claim 11, further comprising refraining from the removing liquid operation when the interior space is occupied by an individual.

13. The method of claim 11, wherein the forming comprises:
positioning an upper layer over the vacuum layer, wherein the upper layer is one or both of formed of or coated with a hydrophobic material, and wherein the upper layer comprises a plurality of openings through which liquid is repelled toward the vacuum layer;
positioning a wicking layer between the vacuum layer and the upper layer, wherein the wicking layer comprises a plurality of pores, wherein the wicking layer is configured to wick liquid away from the upper layer, and wherein the liquid is drawn to the vacuum layer through the plurality of pores; and
positioning a lower support layer between the vacuum layer and the wicking layer, wherein the lower support layer comprises a plurality of perforations through which the liquid is drawn to the vacuum layer.

14. The method of claim 11, further comprising activating an ultraviolet (UV) light to clean the dry floor assembly.

15. The method of claim 14, further comprising refraining from the activating UV light operation when the interior space is occupied by an individual.

16. A vehicle comprising:
an internal cabin, wherein a lavatory is located within the internal cabin;
a dry floor assembly positioned within the lavatory, wherein the dry floor assembly comprises a vacuum layer, wherein the vacuum layer comprises a plurality of ridges separated by liquid-collection grooves, and wherein vacuum channels are formed through portions of the ridges;
a vacuum system secured within a portion of the internal cabin, wherein the vacuum system is coupled to the vacuum layer, wherein the vacuum channels are in fluid communication with the vacuum system, and wherein the vacuum system is configured to remove liquid from the dry floor assembly via the vacuum layer, wherein the vacuum system is configured to be activated when a toilet within the lavatory is flushed; and
an ultraviolet (UV) light positioned within the lavatory, wherein the UV light is configured to clean the dry floor assembly.

17. The vehicle of claim 16, wherein the dry floor assembly further comprises:
an upper layer positioned over the vacuum layer, wherein the upper layer is one or both of formed of or coated with a hydrophobic material, and wherein the upper layer comprises a plurality of openings through which liquid is repelled toward the vacuum layer;
a wicking layer positioned between the vacuum layer and the upper layer, wherein the wicking layer comprises a plurality of pores, wherein the wicking layer is configured to wick liquid away from the upper layer, and wherein the liquid is drawn to the vacuum layer through the plurality of pores; and
a lower support layer positioned between the vacuum layer and the wicking layer, wherein the lower support layer comprises a plurality of perforations through which the liquid is drawn to the vacuum layer.

18. A dry floor assembly that is configured to form or be positioned on a floor of an enclosed space, the dry floor assembly comprising:
a vacuum layer configured to be coupled to a vacuum system, wherein the vacuum system is configured to remove liquid from the dry floor assembly via the vacuum layer;
an upper layer positioned over the vacuum layer, wherein the upper layer is one or both of formed of or coated with a hydrophobic material, and wherein the upper layer comprises a plurality of openings through which liquid is repelled toward the vacuum layer;
a wicking layer positioned between the vacuum layer and the upper layer, wherein the wicking layer comprises a plurality of pores, wherein the wicking layer is configured to wick liquid away from the upper layer, and wherein the liquid is drawn to the vacuum layer through the plurality of pores; and
a lower support layer positioned between the vacuum layer and the wicking layer, wherein the lower support layer comprises a plurality of perforations through which the liquid is drawn to the vacuum layer.

19. A system comprising:
a vacuum system; and a dry floor assembly coupled to the vacuum system, wherein the dry floor assembly is configured to be located within an interior space, wherein the dry floor assembly comprises a vacuum layer comprising:
  a port that fluidly connects to the vacuum system; and
  a plurality of ridges separated by liquid-collection grooves, wherein vacuum channels are formed through portions of the ridges, and wherein the vacuum channels are in fluid communication with the vacuum system,
wherein the vacuum system is configured to remove liquid from the dry floor assembly via the vacuum layer, wherein the vacuum system is configured to be activated when a toilet within the interior space is flushed.

* * * * *